(No Model.) 2 Sheets—Sheet 1.
J. E. HOLMES.
INSTRUMENT FOR REGULATING THE FLOW OF GASES AND LIQUIDS IN REFRIGERATORS AND OTHER STRUCTURES.
No. 332,150. Patented Dec. 8, 1885.
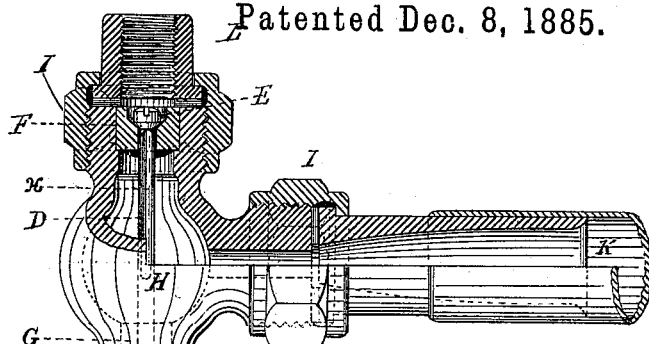
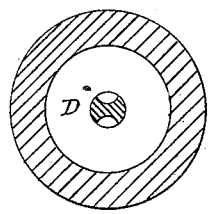
Fig. 2.
Fig. 1.
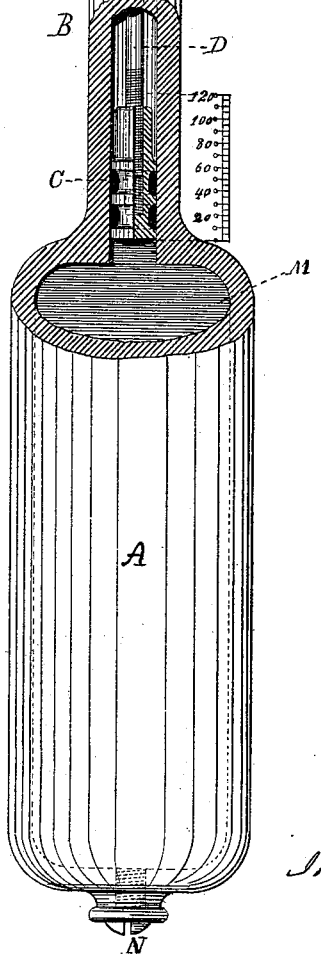
WITNESSES
E. B. Wright.
INVENTOR
Joseph E. Holmes.
By        Attorney

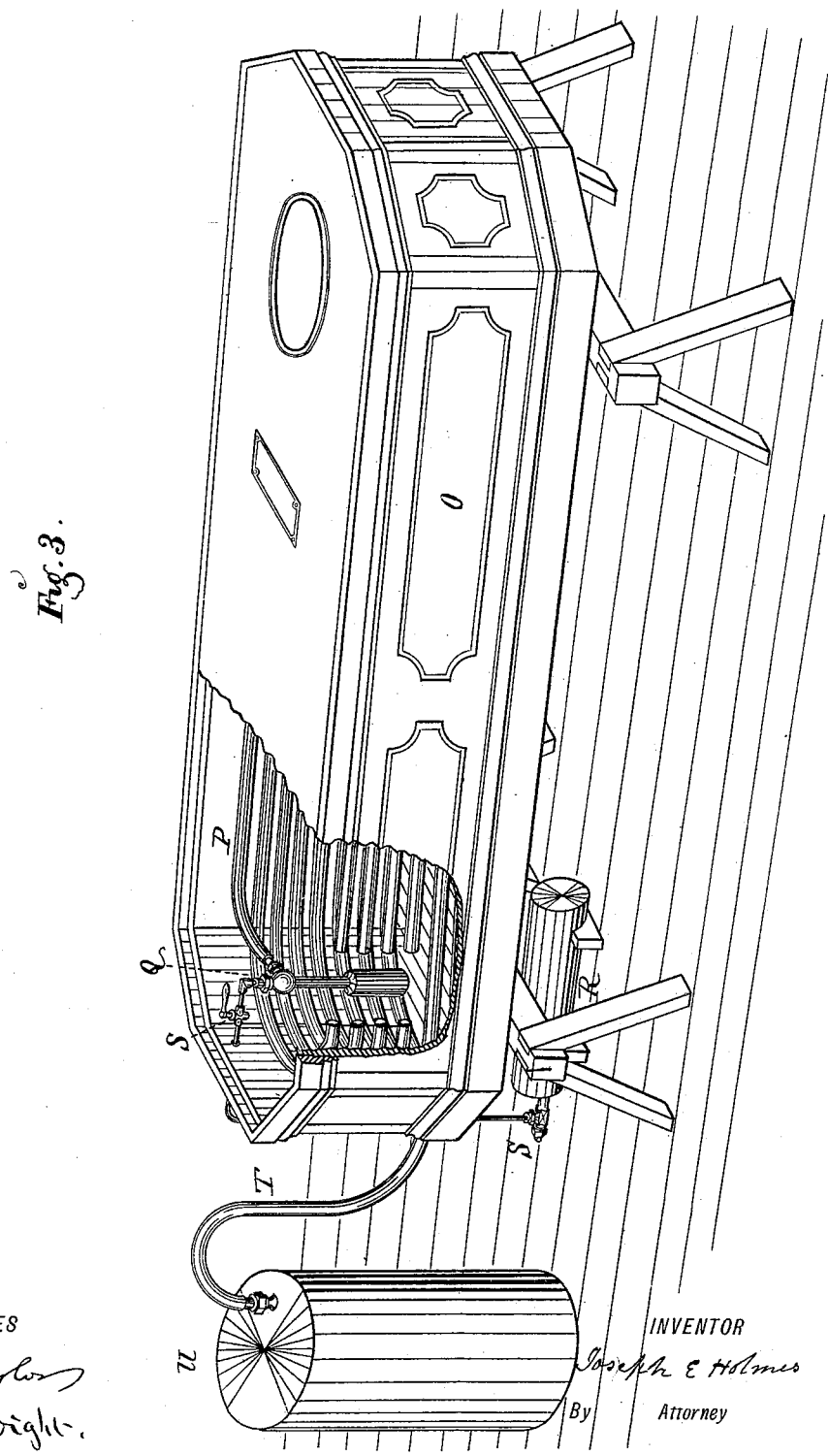

UNITED STATES PATENT OFFICE.

JOSEPH E. HOLMES, OF WASHINGTON, DISTRICT OF COLUMBIA.

INSTRUMENT FOR REGULATING THE FLOW OF GASES AND LIQUIDS IN REFRIGERATORS AND OTHER STRUCTURES.

SPECIFICATION forming part of Letters Patent No. 332,150, dated December 8, 1885.

Application filed May 29, 1885. Serial No. 167,071. (No model.)

*To all whom it may concern:*

Be it known that I, JOSEPH E. HOLMES, a citizen of the United States, residing at the city of Washington, District of Columbia, have invented certain new and useful improvements in instruments for regulating the flow of gases or liquids at any specific degree of temperature for refrigeration and other purposes; and I do hereby declare the following to be a full, clear, and exact description of the invention, such as will enable others skilled in the art to which it appertains to make and use the same.

The object and nature of my invention is the production of an instrument whereby to automatically control and regulate the flow or discharge of liquids or gases under pressure by utilizing in the instrument the expansion and contraction of mercury or other expansible liquids or fluids caused by changes in the surrounding temperature. Thus by the elevation of the temperature the instrument allows a flow or discharge of the liquids or gases, and by the depression or lowering of temperature the flow or discharge is shut off, both or either of which can be regulated to act at any desirable temperature.

The uses or application of this instrument are for cooling or refrigeration by the expansion of fluids or gases liberated from under pressure, and for the extinguishment of fires by the discharge of carbonic-acid gas or other non-combustible fluids from a magazine or water from a reservoir.

The construction of the instrument is fully and clearly shown in the accompanying drawings.

Figure 1 is a sectional elevation of the instrument. Fig. 2 is an enlarged cross-section of the instrument at X, showing the construction of the piston-rod at its upper end, the grooves shown extending far enough downward to give passage to the flowing gases or liquids at any height to which the piston-rod may be lifted under different degrees of temperature. Fig. 3 represents an H. C. Johnson mortuary refrigerating-case, showing an application of my invention to regulate the discharge of compressed fluids or gases to produce a given temperature by the expansion of the escaping gases through the surrounding coils.

A, Fig. 1, indicates the receptacle or chamber to contain the expansible liquid to be acted upon by the surrounding temperature.

B is a neck or contracted portion of the instrument, proportioned in its diameter with the reservoir or chamber A to give a suitable elevation of the expanding liquid in the neck.

C is a piston acted upon by the elevation or depression of the column of liquid in the neck of the instrument.

D D is a piston-rod connected to the piston C by means of a screw-thread, for the purpose of lengthening or shortening the piston-rod in the adjustment of the instrument.

E is a valve attached to the upper end of the piston-rod D, and is raised and lowered by the movement of the piston C through the medium of the piston-rod D. This valve has a screw-driver slot cut in the top for the purpose of adjustment. By turning the piston and rod in either direction the distance between the valve and piston is changed.

F is a valve-seat accurately fitted both to the neck of the instrument and to the valve.

G is a stuffing-gland, (shown in dotted lines,) through which passes the piston-rod D, to prevent the contact of the cold expanded gases with the piston C and the neck of the instrument B, thus preventing as much as possible the conducting influence of the metals.

H is an enlargement of the neck B to facilitate the attachment of connections.

I I are union-couplings for attaching the outflow-pipe K and the inflow-pipe L.

M indicates the mercury or other expanding liquid.

N is a screw-plug for filling or discharging the receptacle or chamber A.

O, Fig. 3, is a case, which may be made in any form or size to suit the various requirements.

P is a coil of pipe of sufficient area and surface to give the required amount of refrigeration or proper temperature.

Q shows my instrument as applied to a refrigerating-case described above as connected with the coil P, governing the discharge of compressed ammoniacal or carbonic-acid gas or other fluids of a like nature.

R is a reservoir containing the compressed fluid or gases.

S S are stop-cocks to shut off the discharge of the gases from the reservoir when the circulation is not required.

T is a flexible hose connected to the discharge end of the coil to convey the expanded gases either into the open air or into an absorbing-reservoir.

U is an absorbing-reservoir.

In adjusting this instrument for practical use regard must be had for the precise object to be accomplished, and if properly carried out will secure a correct adjustment for the purpose to which it is applied. For instance, if it is desired to keep the interior of a case or room or vault at zero, the piston is adjusted, as shown in Fig. 1, with the bottom at the zero-mark, as indicated by the scale near the tube B, when the valve is thoroughly in its seat F, where it must be secured for the time being. Now let the instrument and the liquid with which it is to be filled be immersed in a freezing-mixture ascertained to stand at zero by any reliable thermometer until it is thoroughly reduced to the point desired, when, being turned bottom upward and the screw-plug removed, the receptacle or chamber is to be filled completely full, to the entire exclusion of all air or other substances, the screw-plug adjusted, and the valve released to prevent excessive pressure by the rise of temperature, as the valve will be lifted according to the normal surrounding temperature, and will remain elevated until connected with the coils in the refrigerating case or vault to be acted upon by the cold gases, when the valve will take its place and automatically regulate and control the temperature. The above supposed temperature at zero is undoubtedly an extreme one, and more likely a temperature varying from 20° to 35° may be oftener desired; but the filling of the instrument by shortening the piston-rod, so that the lower end of the piston is at the desired degree when the valve is in its seat, will still insure perfect action, depending entirely upon the conditions of temperature of the instrument and the liquid when filled, and this rule may be followed for preparing it for any higher degree of temperature and still insure its automatic character.

In all cases where the instrument is adjusted for use at lower temperatures than the normal or atmospheric conditions the refrigerating-fluid used must be restrained in the holder or reservoir R by the stop-cocks S S until connected for use; but when the said cocks are opened the instrument will readily assume its functions and continue them until the cooling-fluids are exhausted or arbitrarily closed from acting on the instrument.

I do not confine myself as to the material or forms that may be adopted for the construction of this instrument; but reference must be had to the great pressure of some of the liquid gases, and corresponding strength of materials must be sought. There are many substances that have a much greater expansion by varying temperatures than mercury, notably petroleum-oil and mixtures of glycerine and water of ammonia, rendering it practicable to use smaller bulbs or reservoirs; but I recommend an enlargement rather than any diminution of the diameter of the tube or neck B and piston C.

I am aware that patents have been granted for the operation of valves for the admission of air and other fluids by the liquids used in thermometers; but I am not aware that any of them have the simplicity of construction and accuracy of adjustment or the automatic action insured by the instrument above described. Nor do I know of any that can be adjusted to be used below the freezing-point, or that are operated other than by artificial heat.

In applying this instrument to the releasing of fluids or liquids for the extinguishment of fires it would of course have external heat from the fire, but it would be automatic and self-acting, closing the valve when normal temperature was restored, and for this purpose especially I recommend that reservoir A, Fig. 1, be reduced in its diameter and elongated, that it may reach farther from the gas-holder, and, being smaller in diameter, will be more readily heated or acted upon by the rising temperature in the room.

Several of these instruments may be attached to the pipe leading to the gas-holder and be distributed and placed in those portions of a room or building which are most exposed to fire.

Having thus fully described the nature and construction of my invention, what I claim, and wish to secure by Letters Patent, is—

1. The combination of a closed receptacle for containing an expansible liquid with a conduit for the passage of compressed gases or liquids from a suitable reservoir and an adjustable valve, as specified, whereby the valve is opened by the expansion of the liquid in the receptacle to any fixed degree of temperature desired, and closed by the joint action of the compressed gas and atmospheric pressure acting upon the valve and piston whenever the temperature surrounding the instrument falls below the fixed degree.

2. The combination of a closed receptacle containing an expansible liquid, an adjustable valve with a closely-fitting stem or piston, and a conduit or pipe connecting with any suitable reservoir of compressed gas or fluids, whereby an increase of temperature of the air surrounding the instrument, acting on the expansible liquid in the receptacle, opens the valve when above the fixed and graduated temperature, and closes the valve whenever the temperature falls below the fixed and graduated degree suitable for the required work, substantially as herein described and set forth.

3. The combination of a closed receptacle for containing an expansible liquid with a conduit for the passage of compressed gases or liquids from a reservoir, and an adjustable valve arranged as specified, whereby said valve is opened by the expansion of the liquid in the receptacle, and closed by the joint action of the compressed gas and atmospheric pressure acting on the valve and piston, as and for the purpose specified.

4. The combination of a closed receptacle containing an expansible liquid, a valve with a closely-fitting stem or piston, and a conduit or pipe connecting with a suitable reservoir of compressed gas or fluids, whereby an increase or decrease of temperature of the air surrounding the instrument opens and closes the valve and indicates the temperature, as shown and herein specified.

5. The thermometric governor herein described, consisting of a receptacle for containing an expansible liquid and having a conduit for the passage of compressed gases or liquids from a reservoir, and a valve provided with a stem or piston operating as specified, whereby an increase of temperature of the surrounding air, acting on the receptacle, operates the valve in the manner and for the purpose set forth.

JOSEPH E. HOLMES.

Witnesses:
F. B. TAYLOR,
E. B. WIGHT.